US009118782B1

(12) United States Patent
Coley et al.

(10) Patent No.: US 9,118,782 B1
(45) Date of Patent: Aug. 25, 2015

(54) OPTICAL INTERFERENCE MITIGATION (75) Inventors: Christopher Coley, Morgan Hill, CA (US); Petr G. Shepelev, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 158 days.

(21) Appl. No.: 13/236,294

(22) Filed: Sep. 19, 2011

(51) Int. Cl.
H04N 7/18 (2006.01)
H04N 5/00 (2011.01)
H04N 9/00 (2006.01)

(52) U.S. Cl.
CPC ... H04N 5/00 (2013.01); H04N 9/00 (2013.01)

(58) Field of Classification Search
None
See application file for complete search history.

(56) References Cited

U.S. PATENT DOCUMENTS

| 3,835,245 | A | 9/1974 | Pieters |
| 3,840,699 | A | 10/1974 | Bowerman |
| 4,112,463 | A | 9/1978 | Kamin |
| 5,704,836 | A | 1/1998 | Norton et al. |
| 5,946,209 | A | 8/1999 | Eckel et al. |
| 6,059,576 | A | 5/2000 | Brann |
| 6,098,091 | A | 8/2000 | Kisor |
| 6,503,195 | B1 * | 1/2003 | Keller et al. ............ 600/160 |
| 6,618,076 | B1 | 9/2003 | Sukthankar et al. |
| 6,690,618 | B2 | 2/2004 | Tomasi et al. |
| 6,760,045 | B1 | 7/2004 | Quinn et al. |
| 6,789,903 | B2 | 9/2004 | Parker et al. |
| 6,803,928 | B2 | 10/2004 | Bimber et al. |
| 6,811,267 | B1 | 11/2004 | Allen et al. |
| 7,046,214 | B2 | 5/2006 | Ebersole, Jr. et al. |
| 7,315,241 | B1 | 1/2008 | Daily et al. |
| 7,418,392 | B1 | 8/2008 | Mozer et al. |
| 7,538,764 | B2 | 5/2009 | Salomie |
| 7,720,683 | B1 | 5/2010 | Vermeulen et al. |
| 7,743,348 | B2 | 6/2010 | Robbins et al. |
| 7,774,204 | B2 | 8/2010 | Mozer et al. |
| 7,911,444 | B2 | 3/2011 | Yee |
| 7,925,996 | B2 | 4/2011 | Hofmeister et al. |
| 7,949,148 | B2 | 5/2011 | Rhoads et al. |
| 8,107,736 | B2 | 1/2012 | Brown et al. |
| 8,159,739 | B2 | 4/2012 | Woodgate et al. |
| 8,199,966 | B2 | 6/2012 | Guven et al. |
| 8,253,746 | B2 | 8/2012 | Geisner et al. |

(Continued)

FOREIGN PATENT DOCUMENTS

WO  WO2009112585       9/2009
WO  WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Dave Czekaj
*Assistant Examiner* — Mohammad J Rahman
(74) *Attorney, Agent, or Firm* — Lee & Hayes, PLLC (57) ABSTRACT

Structured light generated by a projector may be recovered by a camera to determine three-dimensional data about a scene. The structured light signal acquired by the camera may be impaired due to interference from flickering sources of illumination such as lights, electronic displays, and so forth. This optical interference to an image acquisition system, such as a structured light system, is mitigated by modifying operation of a camera by applying a sampling coefficient to the camera's frame rate or by presenting structured light frames during times non-coincident with the interference.

23 Claims, 7 Drawing Sheets

(56) References Cited

U.S. PATENT DOCUMENTS

| | | |
|---|---|---|
| 8,264,536 B2 | 9/2012 | McEldowney |
| 8,284,205 B2 | 10/2012 | Miller et al. |
| 8,285,256 B2 | 10/2012 | Gupta et al. |
| 8,307,388 B2 | 11/2012 | Igoe et al. |
| 8,308,304 B2 | 11/2012 | Jung et al. |
| 8,382,295 B1 | 2/2013 | Kim et al. |
| 8,408,720 B2 | 4/2013 | Nishigaki et al. |
| 8,591,039 B2 | 11/2013 | Morrison et al. |
| 2001/0049713 A1 | 12/2001 | Arnold et al. |
| 2002/0001044 A1 | 1/2002 | Villamide |
| 2002/0070278 A1* | 6/2002 | Hung et al. ............ 235/472.01 |
| 2002/0168069 A1* | 11/2002 | Tehranchi et al. ............ 380/235 |
| 2003/0156306 A1* | 8/2003 | Kitamura ............ 359/3 |
| 2004/0046736 A1 | 3/2004 | Pryor et al. |
| 2004/0190716 A1* | 9/2004 | Nelson ............ 380/54 |
| 2004/0201823 A1 | 10/2004 | Raskar et al. |
| 2005/0081164 A1 | 4/2005 | Hama et al. |
| 2005/0110964 A1 | 5/2005 | Bell et al. |
| 2005/0128196 A1* | 6/2005 | Popescu et al. ............ 345/420 |
| 2005/0254683 A1 | 11/2005 | Schumann et al. |
| 2005/0264555 A1 | 12/2005 | Zhou et al. |
| 2005/0276444 A1 | 12/2005 | Zhou et al. |
| 2005/0288078 A1 | 12/2005 | Cheok et al. |
| 2005/0289590 A1 | 12/2005 | Cheok et al. |
| 2006/0028400 A1 | 2/2006 | Lapstun et al. |
| 2006/0041926 A1 | 2/2006 | Istvan et al. |
| 2006/0080408 A1 | 4/2006 | Istvan et al. |
| 2006/0152803 A1 | 7/2006 | Provitola |
| 2006/0170880 A1 | 8/2006 | Dambach et al. |
| 2006/0262140 A1 | 11/2006 | Kujawa et al. |
| 2007/0005747 A1 | 1/2007 | Batni et al. |
| 2007/0024644 A1 | 2/2007 | Bailey |
| 2007/0239211 A1 | 10/2007 | Lorincz et al. |
| 2007/0260669 A1 | 11/2007 | Neiman et al. |
| 2008/0094588 A1 | 4/2008 | Cole et al. |
| 2008/0151195 A1 | 6/2008 | Pacheco et al. |
| 2008/0174735 A1 | 7/2008 | Quach et al. |
| 2008/0180640 A1 | 7/2008 | Ito |
| 2008/0186255 A1 | 8/2008 | Cohen et al. |
| 2008/0229318 A1 | 9/2008 | Franke |
| 2008/0273754 A1 | 11/2008 | Hick et al. |
| 2009/0066805 A1 | 3/2009 | Fujiwara et al. |
| 2009/0073034 A1 | 3/2009 | Lin |
| 2009/0184888 A1 | 7/2009 | Chen et al. |
| 2010/0011637 A1 | 1/2010 | Zhang |
| 2010/0026479 A1 | 2/2010 | Tran |
| 2010/0039568 A1* | 2/2010 | Tchoukaleysky ............ 348/720 |
| 2010/0060723 A1* | 3/2010 | Kimura et al. ............ 348/56 |
| 2010/0066676 A1 | 3/2010 | Kramer et al. |
| 2010/0164990 A1 | 7/2010 | Van Doorn |
| 2010/0199232 A1 | 8/2010 | Mistry et al. |
| 2010/0207872 A1* | 8/2010 | Chen et al. ............ 345/156 |
| 2010/0240455 A1 | 9/2010 | Gagner et al. |
| 2010/0257252 A1 | 10/2010 | Dougherty et al. |
| 2010/0284055 A1 | 11/2010 | Kothari et al. |
| 2011/0012925 A1 | 1/2011 | Luo |
| 2011/0050885 A1 | 3/2011 | McEldowney |
| 2011/0061100 A1 | 3/2011 | Mattila et al. |
| 2011/0072047 A1 | 3/2011 | Wang et al. |
| 2011/0087731 A1 | 4/2011 | Wong et al. |
| 2011/0093094 A1 | 4/2011 | Goyal et al. |
| 2011/0096844 A1 | 4/2011 | Poupel et al. |
| 2011/0134204 A1 | 6/2011 | Rodriguez et al. |
| 2011/0154350 A1 | 6/2011 | Doyle et al. |
| 2011/0161912 A1 | 6/2011 | Eteminan et al. |
| 2011/0164163 A1 | 7/2011 | Bilbrey et al. |
| 2011/0197147 A1 | 8/2011 | Fai |
| 2011/0216090 A1 | 9/2011 | Woo et al. |
| 2011/0238751 A1 | 9/2011 | Belimpasakis et al. |
| 2011/0249197 A1 | 10/2011 | Sprowl et al. |
| 2012/0009874 A1 | 1/2012 | Kiukkonen et al. |
| 2012/0120296 A1 | 5/2012 | Roberts et al. |
| 2012/0124245 A1 | 5/2012 | Reeves et al. |
| 2012/0127320 A1 | 5/2012 | Balogh |
| 2012/0130513 A1 | 5/2012 | Hao et al. |
| 2012/0223885 A1 | 9/2012 | Perez |
| 2012/0306878 A1* | 12/2012 | Wang et al. ............ 345/426 |

OTHER PUBLICATIONS

Office action for U.S. Appl. No. 12/982,519, mailed on Feb. 7, 2013, Worley III, "Complementing Operation of Display Devices in an Augmented Reality Environment", 13 pages.

Office Action for U.S. Appl. No. 12/977,949, mailed on Jan. 22, 2014, William Spencer Worley III, "Powered Augmented Reality Projection Accessory Display Device", 11 pages.

Office action for U.S. Appl. No. 12/977,760, mailed on Oct. 15, 2012, Worley III et al., "Generation and Modulation of Non-Visible Structured Light", 13 pages.

Office Action for U.S. Appl. No. 12/978,800, mailed on Oct. 25, 2013, William Spencer Worley III, "Integrated Augmented Reality Environment", 36 pages.

Office action for U.S. Appl. No. 12/977,924, mailed on Nov. 15, 2013, Coley, et al., "Characterization of a Scene With Structured Light", 9 pages.

Office Action for U.S. Appl. No. 12/982,457, mailed on Dec. 3, 2013, William Spencer Worley III, "Utilizing Content Output Devices in an Augmented Reality Environment", 56 pages.

Office action for U.S. Appl. No. 12/977,760, mailed on Jun. 4, 2013, Worley III et al., "Generation and Modulation of Non-Visible Structured Light ", 12 pages.

Office action for U.S. Appl. No. 12/982,519, mailed on Aug. 29, 2013, Worley III, "Complementing Operation of Display Devices in an Augmented Reality Environment", 12 pages.

Sneath, "The Bumper List of Windows 7 Secrets", retrieved on Aug. 21, 2013, at http://blogs.msdn.com/b/tims/archive/2009/01/12/the-bumper-list-of-windows-7-secrets.aspx, 2009, 13 pages.

Office Action for U.S. Appl. No. 12/975,175, mailed on Apr. 10, 2014, William Spencer Worley III, "Designation of Zones of Interest Within an Augmented Reality Environment", 33 pages.

Office Action for U.S. Appl. No. 12/977,992, mailed on Apr. 4, 2014, William Spencer Worley III, "Unpowered Augmented Reality Projection Accessory Display Device", 6 pages.

Final Office Action for U.S. Appl. No. 12/982,457, mailed on May 8, 2014, William Spencer Worley III, "Utilizing Content Output Devices in an Augmented Reality Environment", 58 pages.

Foscam User Manual, Model:F19821W, retrieved at <<http://foscam.us/downloads/Fl9821W%20user%20manual.pdf, May 2010, pp. 45-46 (71 pages).

Office Action for U.S. Appl. No. 12/975,175, mailed on Oct. 1, 2014, William Spencer Worley III, "Designation of Zones of Interest Within an Augmented Reality Environment", 36 pages.

Office Action for U.S. Appl. No. 12/982,519, mailed on Aug. 14, 2014, Worley III, "Complementing Operation of Display Devices in an Augmented Reality Environment", 12 pages.

Office Action for U.S. Appl. No. 12/982,519, mailed on Feb. 12, 2014, William Spencer Worley III, "Complementing Operation of Display Devices in an Augmented Reality Environment", 12 pages.

Office action for U.S. Appl. No. 12/978,800, mailed on Jun. 17, 2014, Worley III, "Integrated Augmented Reality Environment", 40 pages.

Office Action for U.S. Appl. No. 12/977,760, mailed on Oct. 16, 2014, William Spencer Worley III, "Generation and Modulation of Non-Visible Structured Light", 11 pages.

Office Action for U.S. Appl. No. 12/982,457, mailed on Oct. 8, 2014, Worley III et al., "Utilizing Content Output Devices in an Augmented Reality Environment", 62 pages.

Office Action for U.S. Appl. No. 12/978,800, mailed on Dec. 2, 2014, William Spencer Worley III, "Integrated Augmented Reality Environment", 46 pages.

Office Action for U.S. Appl. No. 12/982,519, mailed on Mar. 5, 2015, William Spencer Worley III, "Complementing Operation of Display Devices in an Augmented Reality Environment", 13 pages.

Final Office Action for U.S. Appl. No. 12/982,457, mailed on Apr. 8, 2015, William Spencer Worley III, "Utilizing Content Output Devices in an Augmented Reality Environment", 64 pages.

* cited by examiner

OPTICAL INTERFERENCE MITIGATION

RELATED APPLICATION

The present application is related to U.S. application Ser. No. 12/977,924, filed on Dec. 23, 2010, entitled "Characterization of a Scene with Structured Light." This pending application is hereby incorporated by reference in its entirety, and the benefit of the filing date of this pending application is claimed to the fullest extent permitted.

BACKGROUND

Optical signals may be acquired from scenes in a variety of environments including homes, offices, factories, and so forth. These scenes may contain sources of illumination which periodically vary. Light from these sources, either direct or reflected, may impinge on an optical sensor and generate interference with acquired signal data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Optical signals may be used to gather data, with these signals varying in wavelength from infrared through visible light and ultraviolet. These optical signals may be used in environments including homes, offices, factories and so forth. For example, cameras may acquire images, light distance and ranging (LIDAR) may be used to scan a scene, and so forth.

Optical signals may also be used in an augmented reality environment supported by an augmented reality system configured to provide for interactions between objects such as tangible real-world objects and presented virtual objects. The augmented reality system may be configured to monitor objects in the physical environment such as users and their gestures. One way to monitor objects is using structured light.

To monitor objects using structured light, a structured light pattern is generated by a projector or other source and recovered by a camera or other imaging device. This pattern may be generated by light in one or more spectral bands including the infrared, visible, and ultraviolet. By processing the recovered pattern after it interacts with objects in the scene, it is possible to determine three-dimensional characteristics about objects in the scene, as described in U.S. patent application Ser. No. 12/977,924, filed on Dec. 23, 2010, entitled "Characterization of a Scene with Structured Light" and incorporated by reference above.

However, the recovery of the structured light signal may be impaired by optical interference sources in the scene. For example, the periodic changes in amplitude of room lights due to alternating current may introduce optical interference into the environment resulting in erroneous or unusable images. As a result, sources of optical interference in the environment may negatively impact acquisition of data.

Disclosed herein are techniques for the mitigation of optical interference. While the following is described in the context of augmented reality environments using structured light, it is recognized that these techniques may be applied in other contexts such as a camera recovering an image of a scene.

An interference mitigation module may implement one or more of the following techniques to mitigate optical interference while acquiring images of the scene or a portion thereof. Mitigation as used herein described the elimination or reduction (e.g., below a pre-determined threshold) of effects an interfering signal has on a signal of interest.

Sources of optical interference may be determined by detecting periodic narrow-band interference data from a camera. Narrow-band as used herein denotes interference having a frequency less than about the frame rate of an optical scanning source such as a projector. Sources of interference may also be identified either by receiving manual input or by scanning the environment for those objects, even when they are idle or not otherwise generating interference. Once identified, data about interference characteristics of these objects may be retrieved from an object datastore. For example, identification of a particular light emitting diode (LED) light fixture may indicate that it generates optical interference with a frequency of 120 Hz. As a result, the interference mitigation module may use one of the techniques described herein to mitigate interference from this source. In another implementation, the light fixture may receive a timing signal from the interference mitigation module indicating when to operate to illumine.

One of the techniques described herein applies an over- or undersampling coefficient "k" to a camera or other input source. The sampling coefficient "k" is configured to mitigate the interference. A filter may then be applied to the individual frames acquired by the camera to remove the interfering signal, or remove an entire individual frame which contains the interfering signal.

Another of the techniques described herein shifts the frame start timing of a projector or other optical source which is generating a signal which is or may be interfered with by the optical interference source. Interference intervals are determined at which interference with structured light is likely to occur. A frame start timing of the projector is then shifted such that the structured light or other desired signal is emitted at times non-coincident with the interference intervals.

Illustrative Environment

Figure 1:
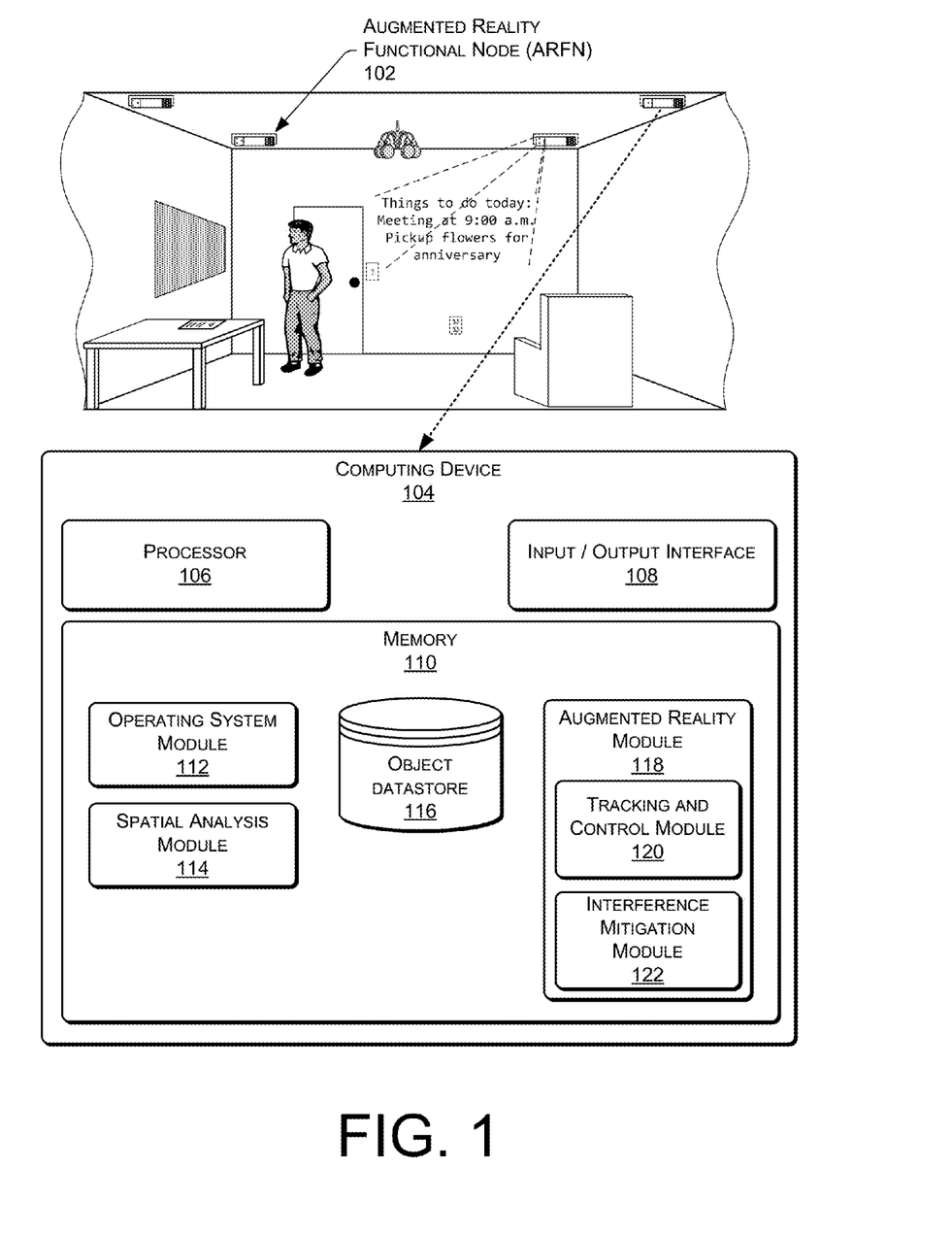
FIG. 1 shows an illustrative scene within an augmented reality environment that includes an augmented reality functional node with associated computing device and an interference mitigation module.

FIG. 1 shows an illustrative augmented reality environment 100 that includes an augmented reality functional node (ARFN) 102 with associated computing device. One or more ARFNs 102 may be positioned on the ceiling of the room. In other implementations, the ARFN 102(s) may be positioned in other locations within the scene, such as on walls, in lamp fixtures, on tables, and so forth. When active, the ARFN 102 may generate an augmented reality environment incorporating the scene. In some implementations, more or fewer ARFNs 102 may be used.

The ARFN 102 is coupled to a computing device 104. This computing device 104 may be within the ARFN 102, or placed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, other computing devices, and so forth. The coupling between the computing device 104 and the devices may be via wire, fiber optic cable, or wireless connection.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, or cloud storage accessible via a wide area network.

A spatial analysis module 114 is configured to perform several functions which may include analyzing a scene to generate a topology, recognizing objects in the scene, dimensioning the objects, modeling the scene, and so forth. Characterization may be facilitated using several technologies including structured light, light detection and ranging (LIDAR), optical time-of-flight, stereoscopic imaging, radar, and so forth either alone or in combination with one another. For convenience, and not by way of limitation, the examples in this disclosure refer to structured light. The spatial analysis module 114 may receive data from input and output components, such as described below with regards to FIG. 2.

An object datastore 116 in the memory 110 is configured to maintain information about objects within the scene. This information may be acquired from the ARFN 102, other input devices, or via manual input. For example, the object datastore may include interference characteristics about an object. These characteristics are discussed in more detail below with regards to FIG. 5. The object datastore 116 may be stored on one or more of the memory of the ARFN 102, storage devices accessible on the local network, or cloud storage accessible via a wide area network. As used in this disclosure, datastore includes lists, arrays, databases, and other data structures used to provide storage and retrieval of data.

An augmented reality module 118 is configured to generate augmented reality output in concert with the physical environment. A tracking and control module 120 may be configured to identify objects within the scene and track their position and in some implementations, orientation. The augmented reality module 118 may access input/output devices within one or more ARFN nodes 102 to generate output, receive input, or both.

The tracking and control module 120 is configured to identify objects within the scene, track their position, and accept gestures as inputs. The tracking and control module 120 may utilize data obtained by the spatial analysis module 114.

The augmented reality module 118 may also include an interference mitigation module 122. The interference mitigation module 122 is configured to determine actual or potential interference sources within the augmented reality environment and mitigate their effects.

Figure 2:
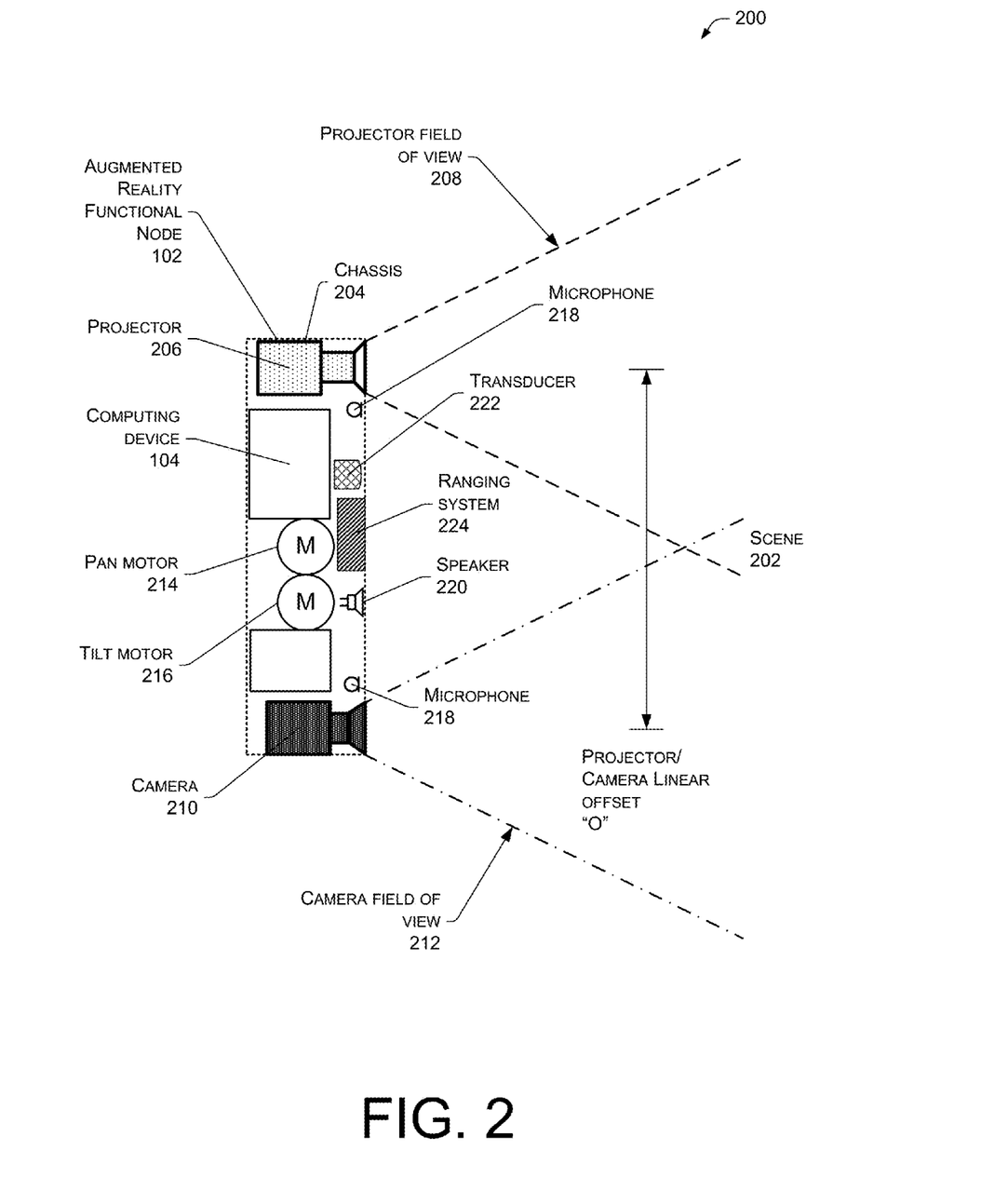
FIG. 2 shows an illustrative augmented reality functional node and selected components.

FIG. 2 shows an illustrative schematic 200 of the augmented reality functional node 102 and selected components. The ARFN node 102 is configured to scan at least a portion of a scene 202 and the objects therein. The ARFN 102 may also be configured to provide output.

A chassis 204 is configured to hold the components of the ARFN 102. Within the chassis may be placed a projector 206. The projector 206 is configured to generate images. These images may be visible light images perceptible to the user, visible light images imperceptible to the user, images with non-visible light, or a combination thereof. This projector 206 may comprise a digital micromirror device (DMD), liquid crystal on silicon display (LCOS), liquid crystal display, 3LCD, and so forth configured to generate an image and project it onto a surface within the environment. This image may in some implementations comprise structured light, such as described below with regards to FIG. 3. In some implementations other display devices may be used in place of or in addition to the projector 206. These display devices may include emissive, reflective, or other display technologies suitable for presenting electronically generated visual information such as bitmaps, raster graphics, and so forth to a user.

The projector 206 has a projector field of view 208 which describes a particular solid angle. The projector field of view 208 may vary according to changes in the configuration of the projector. For example, the projector field of view 208 may narrow upon application of an optical zoom to the projector. In some implementations a plurality of projectors 206 may be used.

A camera 210 or other imager may also be placed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations a plurality of cameras 210 may be used. In some implementations, the camera 210 may be configured to oversample, that is capture additional frames compared to those generated by the projector 206. For example, the projector 206 may be configured to generate 120 frames per second, while the camera 210 may be configured to oversample and capture 180 frames per second. In another implementation, the camera 210 may be configured to undersample, that is capture fewer frames per second compared to those generated by the projector 206.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. The actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be placed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise such as a tap on a wall or snap of the fingers which are pre-designated as inputs within the augmented reality environment. The user may alternatively use voice commands.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be placed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue inputs. For example, these may be acoustic clickers (audible or ultrasonic), electronic signaling devices such as infrared emitters, radio transmitters, and so forth.

Figure 3:
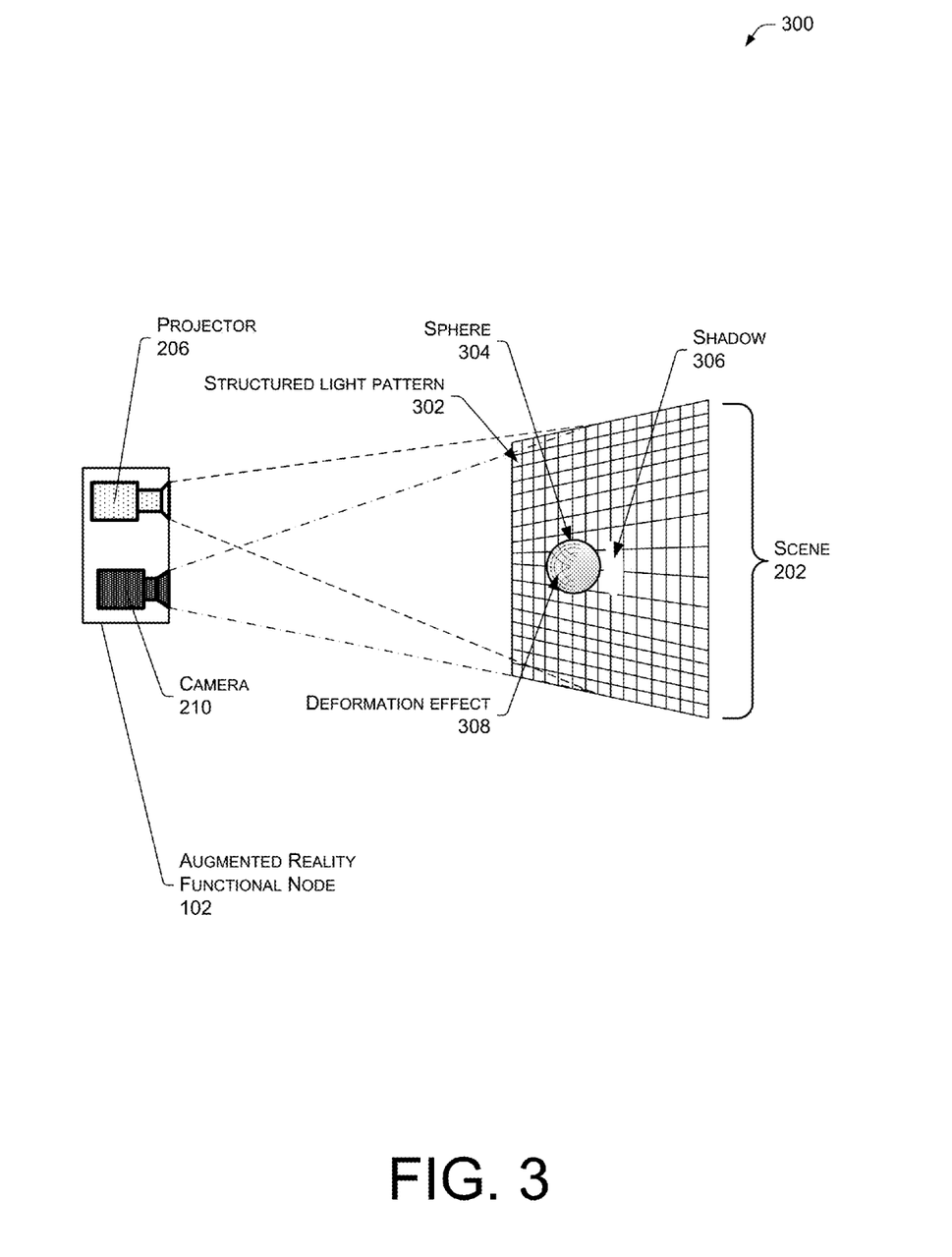
FIG. 3 illustrates the augmented reality functional node projecting a structured light pattern on a scene and receiving a corresponding image of the scene.

FIG. 3 illustrates a structured light pattern 300 impinging on the scene. In this illustration, the projector 206 within the ARFN 102 projects a structured light pattern 302 onto the scene 202. In some implementations a sequence of different structure light patterns 302 may be used. This structured light pattern 302 may be in wavelengths which are visible to the user, non-visible to the user, or a combination thereof. The structured light pattern 304 is shown in this example, but not by way of limitation, as a grid. In other implementations other patterns, such as bars, dots, pseudorandom noise, and so forth may be used. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

A sphere 304 is shown positioned between the projector 206 and a wall in the scene 202. A shadow 306 from the sphere 304 appears on the wall. Inspection of the sphere 304 shows a deformation effect 308 of the structured light pattern 302 as it interacts with the curved surface of the sphere 304. This deformation effect 308 results from the interaction of the structured light pattern 302 generated by the projector 206. The camera 210 may then acquire one or more images of the deformation effect 308 and the structured light pattern 302 otherwise interacting with one or more objects in the environment, such as a wall, floor, furnishing, user, and so forth.

In some implementations other effects, such as dispersion of the structured light pattern 302 may be used to provide information on the topology of the scene. Where the projector 206 and camera 210 have differing fields of view, such as shown in FIG. 2, the dispersion or change in the "density" of the structured light pattern 302 may be used to determine depth of field.

The camera 210 detects the interaction of the structured light pattern 302 with objects within the scene. For example, the deformation effect 308 on the sphere 304 is detected by the camera 210. The camera 210 is configured to sense or detect the structured light. In some implementations the camera 210 may also sense or detect wavelengths other than those used for structured light pattern 302. The image captured by the camera 210 is processed by the spatial analysis module 114 to characterize the scene 202. In some implementations, multiple cameras may be used to acquire the image.

Figure 4:
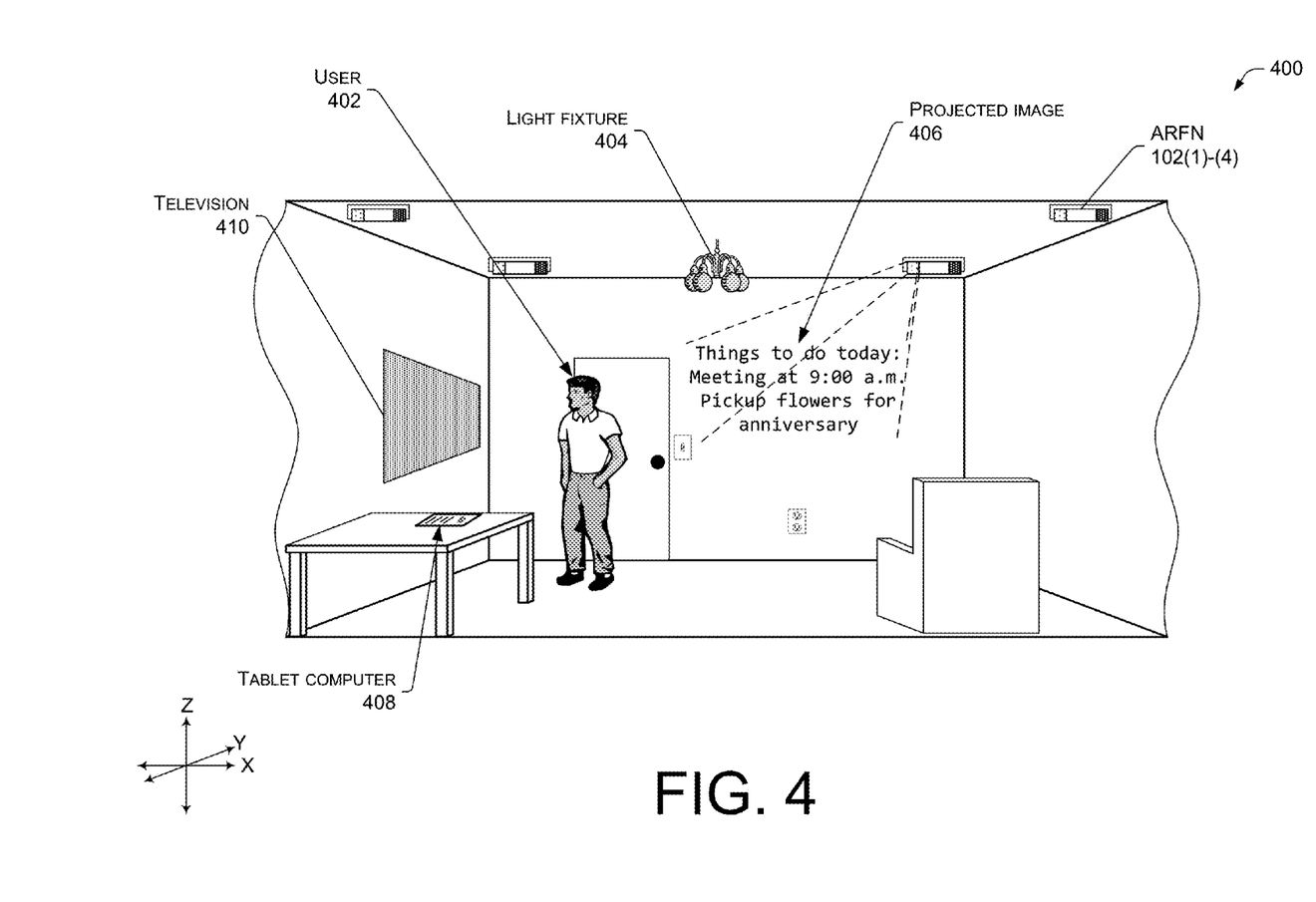
FIG. 4 illustrates elements of the augmented reality environment including several sources of optical interference.

FIG. 4 illustrates elements 400 of the augmented reality environment including several sources of optical interference. As described above, the augmented reality environment may be maintained by ARFNs 102, such as shown here placed on the ceiling. These ARFNs may use structured light generated by the projector 206 and recovered by the camera 210 to generate three-dimensional data about the scene and objects therein. In addition, the ARFNs may project content onto surfaces within the environment, may control devices within the environment (e.g., televisions, lights, window blinds, etc.), or may interact with the environment in any other way.

In this illustration, the user 402 is standing in a room. Overhead, a light fixture 404 provides general illumination to the room. Sources of illumination may include incandescent, fluorescent, electroluminescent, light emitting diodes (LEDs), other structured light emitters, and so forth. Sources of illumination may be subject to periodic changes in their output characteristics, such as flicker resulting from the change in voltage provided by alternating current. For example, a fluorescent light fixture may have amplitude which varies with a frequency of 120 Hz, or twice that of a 60 Hz line frequency, thus exhibiting a flicker rate of 120 Hz.

Sources of illumination may also experience periodic changes in their output characteristics as a result of control circuitry. For example, an LED lamp may be configured to have a particular timing of illumination such as provided by a pulse-width modulator to allow for "dimming" or apparent changes in overall illumination. Because of these periodic changes, sources of illumination may thus produce optical interference.

As described above, the ARFNs 102 may generate structured light as well as images configured for presentation to the user 402. As shown here, one of the ARFNs 102 has generated a projected image 406. This projected image 406 may provide cues or information to the user, such as a list of things as presented here.

A scene may contain a variety of electronic devices such as a tablet computer 408, television 410, cellular phone, desktop computer, consumer electronic device, and so forth. These electronic devices may use display screens which are refreshed at a given frequency. For example, the television 410 may have a refresh rate of 120 Hz, the tablet computer 408 screen may have a refresh rate of 60 Hz, and so forth.

When an electronic display refreshes, it may experience changes in overall brightness, chrominance, and so forth. These changes may result in optical interference when imaged by the camera 210. As a result, the presence of one or more of these interference sources in the scene may impair the acquisition of an image such as a structured light signal suitable for characterization of the objects in the environment.

In some implementations a device that generates interference or which has the potential to interfere may be configured to communicate with other devices in the augmented reality environment such as the computing device 104. This communication may be used to provide for interference data such as a frequency of refresh currently in use, timing synchronization, and so forth. This interference data may then be used by the interference mitigation module 122 to mitigate the interference between the source of the optical interference and the sensor being interfered with. For example, a timing synchronization signal may be configured to be received from the other device by the system to determine when interference is occurring.

In another implementation the interference mitigation module 122 may generate a timing signal used by other devices in the environment to indicate when they are to be active. The timing signal may comprise brightness, chromaticity, and other information, configured such that the interference is mitigated. For example, the interference mitigation module 122 may send a timing pulse indicating a maximum illumination level and specifying that the illumination source is to decrease a level of red light during a particular time interval to minimize interference with structured light.

In another implementation the communication may be used to alter operational characteristics of the interfering source. For example, the interference mitigation module 122 may communicate with the tablet computer to configure it to operate with timing and a refresh rate which mitigates interference with structured light recovery.

Figure 5:
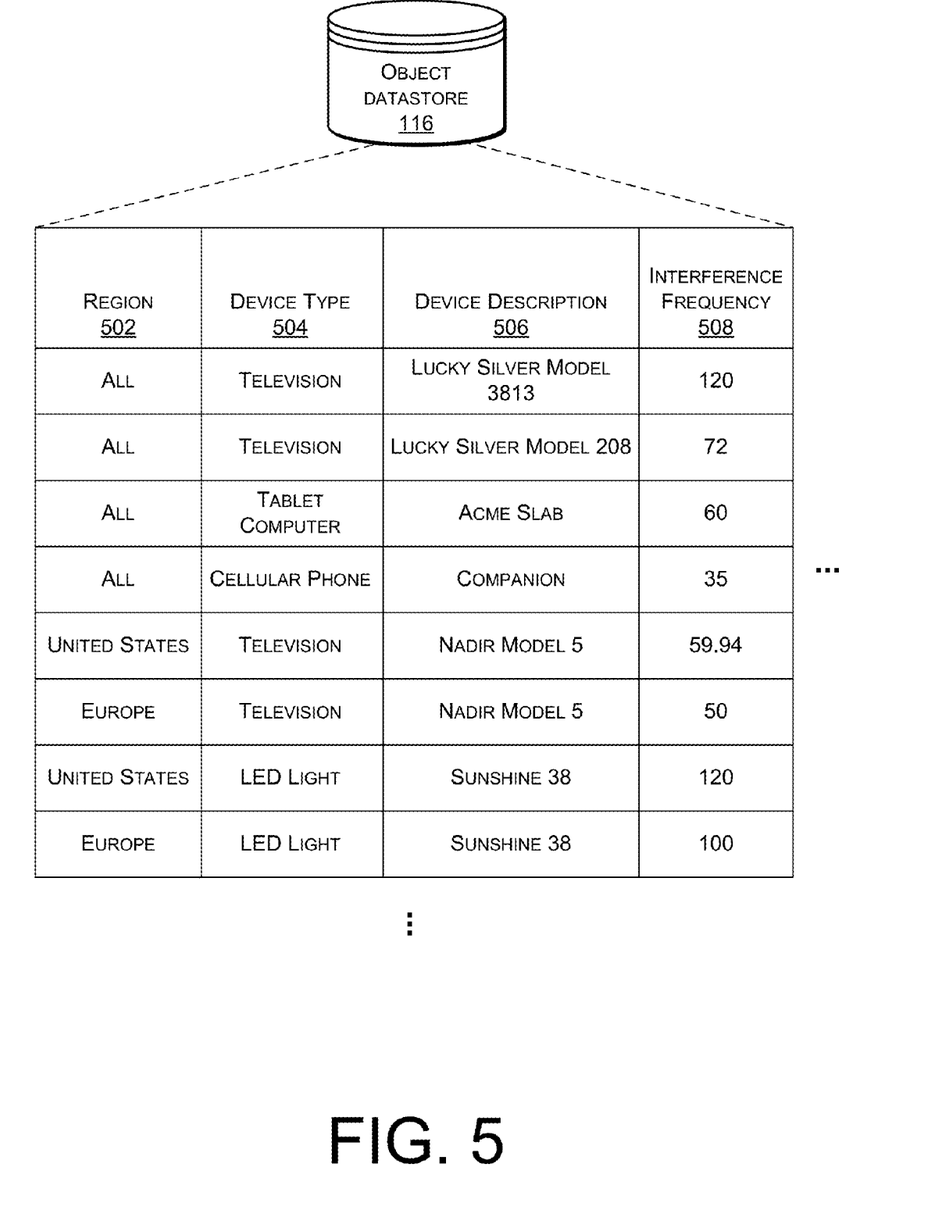
FIG. 5 illustrates a portion of an object datastore containing information about interference sources.

FIG. 5 illustrates a portion of the object datastore 116 containing information about interference sources. Information about interference sources or potential interference sources within the augmented reality environment may be provided via several mechanisms, as described next.

In some instances, a user may manually input information about a potential interference source. For example, a user may indicate that the tablet computer 408 is an "Acme Slab". In other instances, information about interference sources may be gathered from shipment or manifest data. For example, upon opening a box with contents known to be the "Acme Slab" as shipped from a retailer, the object may be identified as the "Acme Slab" tablet computer.

The ARFNs 102 may scan the environment to locate potential interference sources. For example, an ARFN 102 may acquire an image of the inactive television 410 on the wall, and using pattern recognition may determine that the television 410 is a "Lucky Silver Model 3813".

In other instances, an interfering signal such as acquired by the camera 210 may be used to identify a source. For example, the light fixture 404 may flicker at 137 Hz which allows for the identification as a "Green Tree 39".

Information about objects which may generate interference may be stored in the object datastore 116. This information may include a geographic region 502 within which the object is typically found. For example, regions may include the United States, Europe, Middle East, Asia, and so forth. The list of interfering objects may be filtered according to the current region of the augmented reality environment. For example, consumer objects which are sold and used in Europe with the 50 Hz power frequency are unlikely to be present in an augmented reality environment in the United States which uses a 60 Hz power frequency.

The object datastore 116 may also store an indication of a device type 504 of the corresponding devices. For example, as shown here the device type 504 indicates whether the object device is a television, tablet computer, cellular phone, LED light, and so forth. A device description 506 comprises a user-friendly designation, such as the "Lucky Silver Model 3813".

The object datastore 116 may store the interference frequency 508. In some implementations, the interference frequency 508 may be relative to a reference signal, such as when the source is locked to an AC power line frequency. Or it may be indicated that the interference frequency 508 is free-running, such as when using an internal clock. In some implementations other data such as the spectral band of the interference, duration, and so forth may also be stored in the object datastore 116.

Different versions of the same device type 504 and device description 506 may be present with different interference frequencies. For example, as shown here the "Nadir model 5" when located in the United States has an interference frequency of 59.94 Hz, while in Europe the interference frequency is 50 Hz.

By providing details as to the nature of the interference, the object datastore 116 allows the interference mitigation module 122 to more effectively mitigate interference by tailoring the mitigation techniques to the interfering source. For example, given the presence of a "Lucky Silver model 3813" television in the environment with a 120 Hz refresh rate, the interference mitigation module 122 may be configured to synchronize a 120 Hz sampling rate of the camera 210 with the television. Or, where the "Companion" cellular phone is present the timing for the cellphone's 35 Hz refresh rate may be determined and the sampling of the 120 Hz camera shifted to avoid interference from the phone.

Illustrative Processes

The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 6:
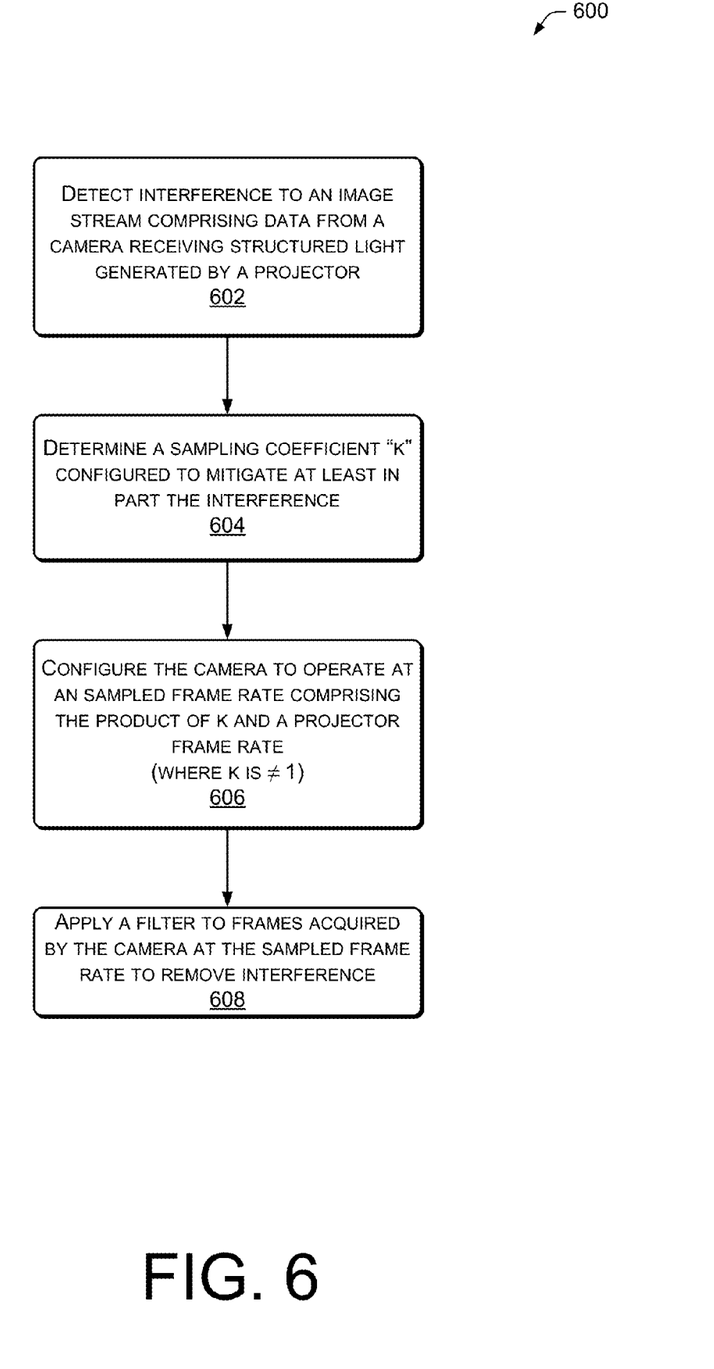
FIG. 6 illustrates a process of optical interference mitigation by over- or undersampling a camera.

FIG. 6 illustrates a process 600 of optical interference mitigation by over- or undersampling a camera. In some implementations, the following operations may be performed at least in part by the interference mitigation module 122.

At 602, the interference mitigation module 122 may detect interference to an image stream, which may comprise data from a camera receiving structure light generated by a projector. For example, the camera 210 may be receiving a stream of images corresponding to structured light projected by the projector 206. This interference may be detected by looking for narrow-band interference. Narrow-band interference comprises interference having a frequency less than the frame rate of the optical source, such as the projector 206. For example, the projector 206 may operate at a frequency of 120 Hz, projecting image frames including structured light 120 times per second. A display operating with a refresh rate of 72 Hz would thus generate optical interference at the camera 210. Interference may be generated by emissive interference sources such as electric lights, display screens, and so forth which emit light. Interference may also be generated by reflective sources such as interferometric displays which are modulated to selectively reflect light.

Interference may also be detected by analyzing amplitude changes in the image stream. For example, over a period of time an interfering source may exhibit increases and decreases in relative brightness as detected by the camera 210. In another implementation, interference may also be detected by looking for particular geometric shapes, a reoccurring pattern, or both within the image stream. For example, a periodic recurring shape of a flashing rectangular pattern across a series of image frames may interpreted as an interference source.

In some implementations, where the presence of an interfering source is known, the details about actual or potential interference may be retrieved from the object datastore 116 such as described above with regards to FIG. 5. Thus, in these implementations the detection of 602 may be omitted or made optional. For example, the detection of 602 may be configured to confirm when interference is actually present. Such a confirmation may then be used to determine whether to use the interference mitigation techniques described herein.

At 604, a sampling coefficient "k" is determined which is configured to mitigate at least in part the interference. By over- or undersampling, the time period during which interference is experienced is reduced. In some implementations, the sampling coefficient may have been previously determined and stored in the object datastore 116. In some implementations the sampling coefficient "k" may change dynamically as the interference changes with time. For example, the interference source may change frequency resulting in a corresponding shift to "k" to continue interference mitigation.

At 606, the camera 206 is configured to operate at an oversampled or under-sampled rate comprising the product of k and a projector frame rate. To provide for over- or undersampling, k is not equal to one. Continuing the example above, with the sampling coefficient "k" set to 1.2, the camera 210 acquires images at 144 Hz or frames per second while the projector 206 remains operating at 120 Hz. As a result, the interference by the 72 Hz display is reduced or eliminated.

At 608, a filter is applied to frames acquired by the camera 206 at the sampled frame rate to remove the interference. For example, out of the 144 frames acquired per second by the camera 210 because of the oversampling, frames exhibiting interference, such as frames number 72 and 144, may be discarded without adversely affecting processes which call for the 120 frames per second. In other implementations, these frames exhibiting interference may have additional signal processing applied selectively to minimize the effects of the interference.

Figure 7:
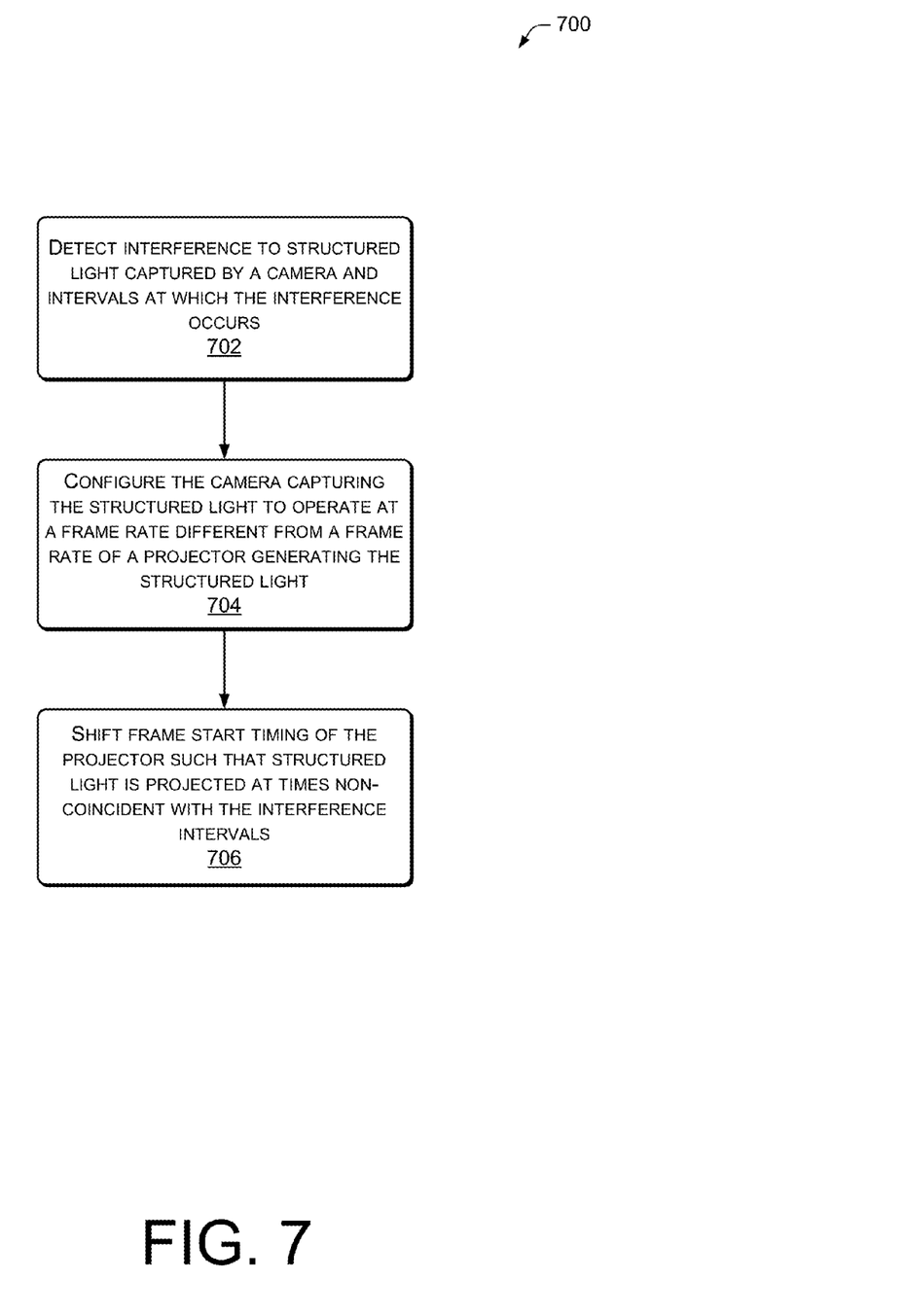
FIG. 7 illustrates a process of optical interference mitigation by altering a projection.

FIG. 7 illustrates a process 700 of optical interference mitigation by altering characteristics of a projection. At 702, the interference mitigation module 122 may detect interference to an image stream such as structured light captured by a camera receiving structure light generated by a projector, as well as the intervals at which the interference occurs. For example, as described above the camera 210 may be receiving a stream of images corresponding to structured light projected by the projector 206. This interference may be detected by looking for narrow-band interference. For example, projector 206 may operate at a frequency of 120 Hz, projecting image frames including structured light 120 times per second. A display on a tablet computer operating with a refresh rate of 60 Hz would thus generate optical interference at the camera 210. Given the frame rate of the projector 206 and the frequency of the interference, the interference intervals may be calculated as the point in time where the two overlap such that interference above a pre-determined threshold is present in the output signal of the camera 210.

As also described above, in some implementations where the presence of an interfering source is known, the details about actual or potential interference may be retrieved from the object datastore 116 such as described above with regards to FIG. 5. Thus, in these implementations the detection of 702 may be omitted or made optional. For example, the detection of 702 may be configured to confirm when interference is actually present. Such a confirmation may then be used to determine whether to use the interference mitigation techniques described herein.

At 704, in some implementations the camera 210 acquiring the image stream may be configured to operate at a frame rate different from to the frame rate of the projector 206 generating the structured light. Furthermore, in some implementations this configuration may occur before step 702. For example, information about a potentially interfering device may be available before the interfering device enters the augmented reality environment and the mitigation change made in advance.

The frame rate of the camera 210 may be greater than or equal to the frame rate of the projector 206, or less than the frame rate of the projector 206. In some situations the projector of the structured light may be configured as a static source of structured light, or one with flicker rate or frame rate which is slower than that of the camera 210. For example, a light fixture may be configured to generate and project a static structured light pattern throughout the room. That light fixture may have a flicker rate of less than the camera 210 frame rate.

At 706, frame start timing of the projector 206 is shifted such that the structured light frames are projected at times non-coincident with the interference intervals or such that the interference is mitigated. The frame start timing designates when presentation of a particular frame of the projector is scheduled to begin. Thus, while the interfering signal is absent the structured light frame is presented. Similarly, while the interfering signal is present, the structured light is not presented and recovered. In some implementations, such as when the structured light source has a lower rate, flicker rate, or is static, the camera 210 frame rate may be reduced to allow for improved recovery of the structured light.

A phase-locked loop (PLL) or other mechanism may be used to synchronize the desired frame start timing. For example, where the interfering signal results from a free running clock in a laptop computer display, data about the laptop display such as recovered by the camera 210 or via a wireless connection with the laptop may be locked onto the by the interference mitigation module 122. This data may be used to maintain synchronization of the frame start timing to mitigate the interference. Over time, as the clocks in the computing device 104, the laptop, or both, begin to drive from one another, the PLL may shift timing to maintain the mitigation.

This shifting or hopping of the structured light frames may be ongoing. For example, the presence in the same scene of several sources of optical interference each with different interference frequencies may result in a series of shifts. The timing of each of these shifts may be asymmetrical, for example, one shift at 10 ms, another at 17 ms, another at 9 ms, and so forth.

In another implementation the shifting may comprise transposing frames containing structured light with frames containing non-structured light. Thus, in place of a scheduled structured light frame which would experience interference, a non-structured light frame is presented instead, with the structured light frame being presented at the time scheduled for the non-structured light frame. Mitigation techniques may also be configured to adapt to relative persistence and prevalence of the interference in the environment. For example, interference from a permanent light fixture may be addressed, while a user walking through a room with a tablet computer may be ignored unless they have been determined they will be there long enough.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
a processor;
a projector coupled to the processor and configured to generate structured light at a projector frame rate;
a camera coupled to the processor and configured to capture at least a portion of the structured light after interaction with one or more objects;
memory, accessible by the processor; and
an interference mitigation module stored in the memory and executable by the processor, the interference mitigation module configured to:
detect interference by an emissive interference source to the structured light captured by the camera;
dynamically determine a temporal sampling coefficient "k" for at least partly reducing a level of the detected interference;
dynamically configure the camera to operate at a sample frame rate comprising a product of the temporal sampling coefficient "k" and the projector frame rate; and
apply a filter to frames acquired by the camera at the sample frame rate to remove at least a portion of individual frames acquired by the camera and affected by the detected interference.

2. The system of claim 1, wherein the detection of the interference comprises finding periodic variations of amplitude across a series of image frames.

3. The system of claim 1, wherein the detection of the interference comprises finding periodic recurring shapes across a series of image frames.

4. The system of claim 1, wherein the removed individual frames contain an interfering signal above a pre-determined amplitude threshold.

5. The system of claim 1, wherein:
the interference mitigation module is further configured to dynamically determine a frequency of the interference; and
the dynamically determining of the temporal sampling coefficient "k" is based at least in part on the frequency of the interference.

6. The system of claim 1, wherein the filter comprises one or more low-pass filters.

7. One or more non transitory computer-readable media storing computer-executable instructions that, when executed, cause one or more processors to perform acts comprising:
dynamically determining a temporal sampling coefficient for mitigating interference in an image stream acquired by a camera capturing at least a portion of structured light generated by a structured light source;
dynamically configuring the camera to acquire the image stream at a sample frame rate comprising a product of the temporal sampling coefficient and a frame rate or flicker rate of the structured light source; and
applying a filter to one or more individual frames in the image stream to remove at least a portion of remaining instances of the interference.

8. The one or more non transitory computer-readable storage media of claim 7, wherein the temporal sampling coefficient is not equal to one.

9. The one or more non transitory computer-readable storage media of claim 7, the acts further comprising:
determining a source of the interference; and
accessing, from a datastore, an interference frequency of the source of the interference,
wherein the dynamically determining the temporal sampling coefficient is based at least in part on the interference frequency of the source of the interference.

10. The one or more non transitory computer-readable storage media of claim 7, the acts further comprising detecting the interference to the structured light captured by the camera by analyzing variations in intensity between a plurality of frames in the stream of frames.

11. The one or more non transitory computer-readable storage media of claim 10, wherein the interference comprises narrow-band interference having a frequency less than the frame rate or flicker rate of the structured light source.

12. A system comprising:
a processor;
a projector coupled to the processor and configured to generate structured light;
a camera coupled to the processor and configured to capture a series of image frames at a camera frame rate, the image frames containing at least a portion of the generated structured light after interaction with one or more objects;
memory, accessible by the processor and configured to store at least a portion of the series of image frames;

an interference mitigation module stored in the memory and configured to:
  detect interference to the structured light in the series of image frames and intervals at which the interference occurs in the series of image frames; and
  dynamically configure the projector to operate at a projector frame rate such that structured light is projected for capture by the camera at times non-coincident with the intervals at which the interference occurs.

13. The system of claim 12, wherein the interference mitigation module is further configured to configure the camera to operate such that the camera frame rate differs from the projector frame rate.

14. The system of claim 12, wherein the interference mitigation module is further configured to:
  identify an object generating the interference; and
  retrieve, from a datastore, the intervals of the object generating the interference at least partly in response to the identifying.

15. The system of claim 12, wherein the interference mitigation module is further configured to shift frame start timing of the projector such that the structured light is projected for capture by the camera at the times non-coincident with the intervals at which the interference occurs.

16. The system of claim 15, wherein the shifting comprises transposing frames containing structured light with frames containing non-structured light.

17. One or more non transitory computer-readable media storing computer-executable instructions that, when executed, cause one or more processors to perform acts comprising:
  determining intervals at which interference to a structured light signal occurs during imaging by a camera of the structured light signal; and
  dynamically configuring a projector to operate at a projector frame rate such that structured light is presented at one or more times non-coincident with the intervals at which the interference occurs, the structured light being captured by the camera to create the structured light signal.

18. The one or more non transitory computer-readable storage media of claim 17, wherein the determining of the intervals comprises:
  identifying an object generating the interference; and
  retrieving, from a datastore, the intervals of the object generating the interference at least partly in response to the identifying.

19. The one or more non transitory computer-readable storage media of claim 17, the acts further comprising configuring the camera to operate at a frame rate greater than the projector frame rate of the projector generating the structured light.

20. The one or more non transitory computer-readable storage media of claim 17, the acts further comprising shifting a frame start time of the projector generating the structured light such that the structured light is presented at the one or more times non-coincident with the intervals at which the interference occurs.

21. The one or more non transitory computer-readable storage media of claim 17, wherein the shifting the frame start time comprises shifting the frame start time by an integer number of frames.

22. The system of claim 5, wherein the interference mitigation module determines the frequency of the interference by accessing a datastore that includes an interference frequency associated with the emissive interference source.

23. The system of claim 22, wherein the datastore is populated at least in part by detecting, by the camera, the emissive interference source and writing, by the processor, data associated with the emissive interference source to the datastore.

* * * * *